United States Patent [19]

Hines

[11] Patent Number: 4,700,570
[45] Date of Patent: Oct. 20, 1987

[54] HARD STATIC BALANCING MACHINE
[75] Inventor: Gordon E. Hines, Ann Arbor, Mich.
[73] Assignee: Hines Industries, Inc., Ann Arbor, Mich.
[21] Appl. No.: 839,886
[22] Filed: Mar. 14, 1986
[51] Int. Cl.4 ............................................. G01M 1/02
[52] U.S. Cl. ..................................................... 73/483
[58] Field of Search .................. 73/482, 483, 484, 485

[56] References Cited

U.S. PATENT DOCUMENTS

| 2,940,315 | 6/1960 | Rued ..................................... | 73/483 |
| 3,991,620 | 11/1976 | Fencl et al. ............................ | 73/462 |
| 4,467,650 | 8/1984 | Hines et al. ............................ | 73/483 |

FOREIGN PATENT DOCUMENTS 1340418  12/1973  United Kingdom .................. 73/483

Primary Examiner—John Chapman
Attorney, Agent, or Firm—Emch, Schaffer, Schaub & Porcello Co.

[57] ABSTRACT

A hard static balancing machine is disclosed. A pivot pin member is mounted at the top of a stationary support member. A workpiece support assembly is pivotally mounted on the pivot pin member. A force transmitting member extends downwardly from the workpiece support assembly adjacent said stationary support member. Force rods are attached to the depending transmitting member and extend completely through the stationary support member. A load cell assembly is attached to each of the force rods for measuring workpiece displacement and for applying a restoring force to each of said force rods.

8 Claims, 7 Drawing Figures

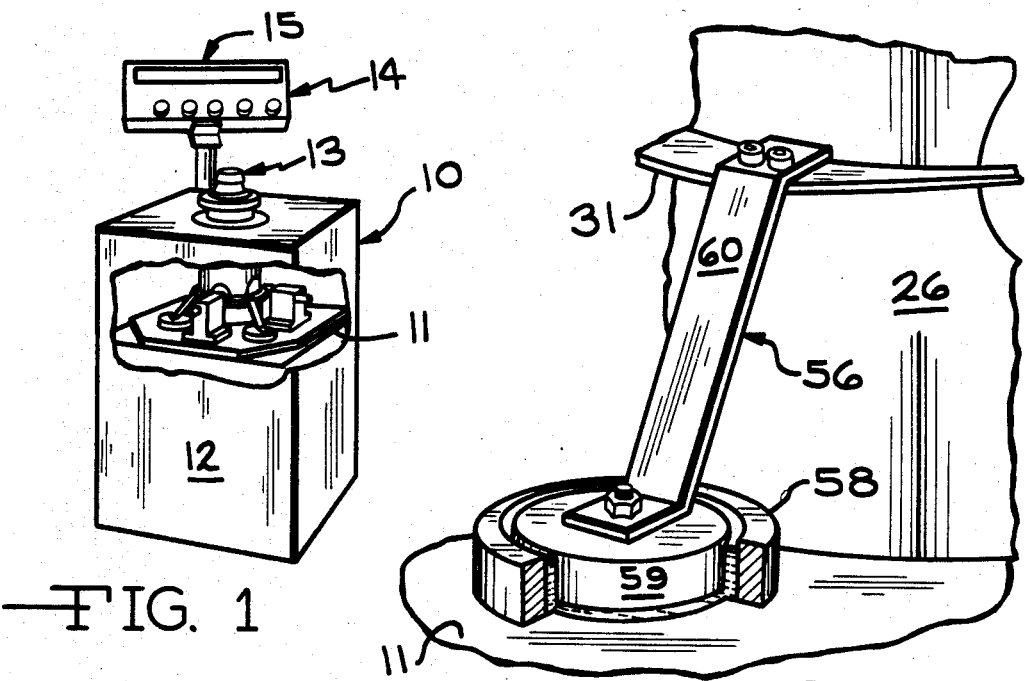
FIG. 1
FIG. 6
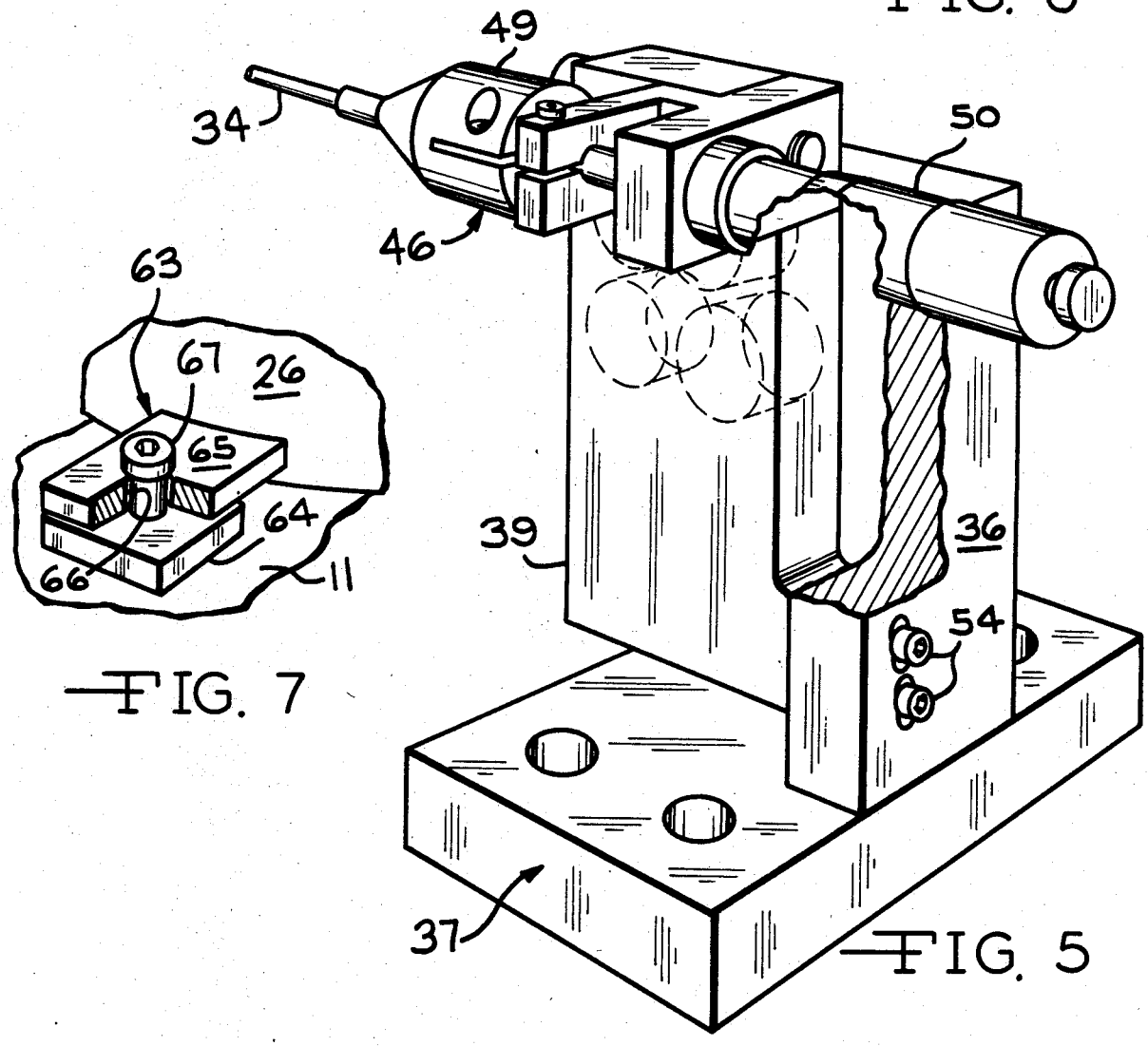
FIG. 7
FIG. 5

HARD STATIC BALANCING MACHINE

BACKGROUND OF THE INVENTION

The present invention relates to an improved hard static balancing machine. Static balancers are machines designed to determine the balance of a rotating workpiece without the necessity of actually spinning the workpiece.

A hard static balancer is a balancer which has a hard suspension. In this type of a balancer, only minute deflections results from the unbalance. This deflection is transferred to a force transducer which is capable of directly reading unbalance movement with the negligible deflection.

A discussion of prior art static balancing machines is provided in U.S. Pat. No. 4,467,650, which is incorporated herein by reference.

The hard static balancer of the above-identified U.S. Pat. No. 4,467,650 incorporated a single element flexure pivot for providing workpiece support while permitting tilting movement of the workpiece around a vertical axis. A pair of linear variable differential transformers (LVDTs) were utilized to receive and measure the unbalance effects from workpiece displacement. Restoring springs were provided to return the transmitting member to a zero or home position upon removal of the workpiece.

It has been found that the incorporation of a linear variable differential transformer (LVDT) into a static balancing machine sometimes results in a balancer which is difficult to return to its home position. The core of the LVDT is attached to the central transmitting member. The body of the LVDT which normally includes a primary coil and two secondary coils is initially carefully positioned with respect to the core to avoid physical contact and to obtain the null or home reading on the electric readout control panel.

If the ambient temperature within a factory setting varies greatly, it is often difficult to adjust the LVDT to return the readout to its home position.

SUMMARY OF THE INVENTION

The present invention is an improved hard static balancing machine in which strain gauge load cells are positioned at right angles relative to one another. The strain gauge load cells are connected by force transmitting rods to a force transmitting member. This transfers the unbalanced force from the workpiece to the strain gauge load cells. Deflection of the force transmitting member imposes a force on the rods which in turn transfers the force to one of the strain gauge load cells. An important feature of the present invention is that each of the rods extends completely through the central support member of the hard static balancing machine. It has been found that by extending the rods completely through the center of the balancing machine that changes in temperature are compensated for since the central support member expands or contracts equally from its centerline. Therefore, the rods basically expand and contract in a balanced out condition and the load cells do not detect most changes due to temperature fluctuation.

In addition, the strain gauge load cells, according to the present invention, act as integral restoring springs. When the workpieces are removed, the load cells transmit force back to the rods to return the force transmitting member to its home position.

Preferably an adjuster is also positioned on each of the force transmitting rods. The adjuster allows the force on the rod to be adjusted to initially return the control readout to zero without the necessity of mechanically adjusting the overall strain gauge load cell assemblies.

A BRIEF DESCRIPTION OF THE DRAWINGS

FIG. 1 is a perspective view of the hard static balancing machine, according to the present invention;

FIG. 5 is a perspective view, partially in section, of the mounting of a load cell assembly and the force rod adjuster;

FIG. 6 is a fragmentary perspective view of the damping apparatus; and

FIG. 7 is a fragmentary perspective view of a load cell stop.

DETAILED DESCRIPTION OF THE PREFERRED EMBODIMENT

Figure 2:
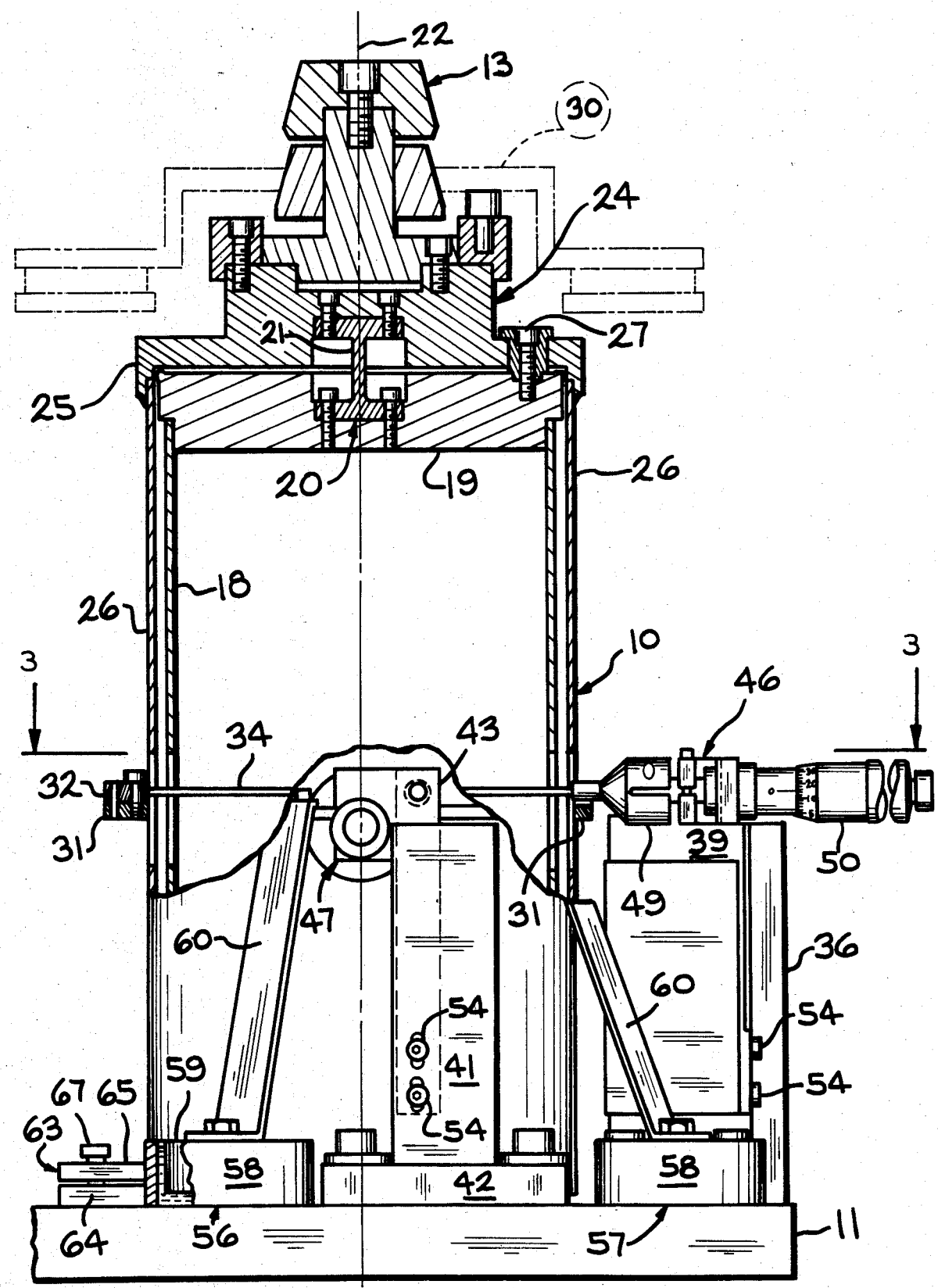
FIG. 2 is a side view of the hard static balancing machine, according to the present invention, with the housing removed.

A hard static balancing machine, according to the present invention, is generally indicated by the reference number 10. Referring to FIGS. 1 and 2, the balancing machine 10 includes a base 11, an outer housing 12, workpiece tooling 13 adjacent the upper end, an electronic readout unit 14 and a visual display 15.

Referring to FIG. 2, a stationary support member, for example, a tube 18 is mounted on and extends upwardly from the machine base 11. A cap member 19 is mounted on the upper end of the support member 18. In turn, the cap member 19 defines a recess which removably mounts a pivot pin member 20. The pivot pin member 20 includes a cylindrical central portion 21. The pivot pin member 20 is aligned along a vertical axis 22 defined by the support member 18.

A workpiece support assembly is generally indicated by the reference number 24 and is mounted on the upper end of the pivot pin member 20. The workpiece support assembly includes a circular hub 25 which mounts a depending transmitting member or tube 26. The transmitting member 26 is spaced from the outer cylindrical periphery of the support member 18 and is pivoted from the pivot pin member 20.

A safety stop pin 27 is provided between the hub 25 and the cap member 19 of the support member 18. The stop pin 27 retards rotation of the support assembly 24 relative to the stationary support member 18.

The workpiece tooling 13 is mounted on the workpiece support assembly 24 and receives a workpiece 30, indicated by dashed lines in FIG. 2. It is understood that many types of tooling or tooling fixtures may be utilized in connection with the hard static balancing machine 10, according to the present invention.

A ring 31 extends around the periphery of the transmitting member 26. Connectors 32 and 33 on the ring 31 mount a pair of perpendicularly positioned force rods 34 and 35, respectively. The force rods 34 and 35 extend completely through the central support member 18 and extend outwardly from the transmitting member 26. As the transmitting member 26 moves or deflects relative to the central support member 18, as a result of unbalance of the workpiece 30, force is applied to the force rods 34 and 35.

Figure 3:
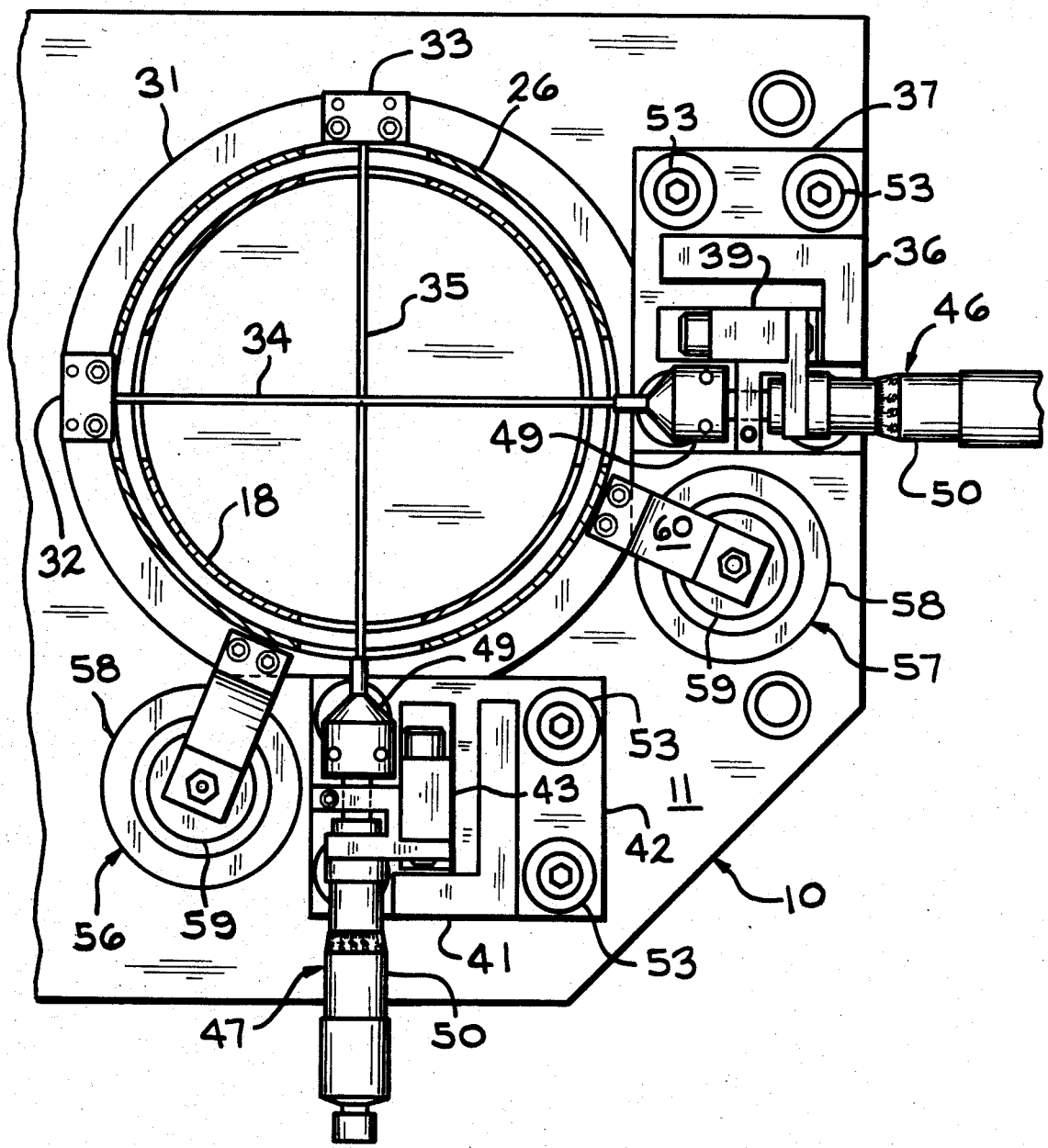
FIG. 3 is a cross-sectional view taken along the line 3—3 of FIG. 2.

Referring to FIGS. 3 and 5 a generally L-shaped guard member 36 extends upwardly from an adjusting base 37 mounted on the machine base 11. The L-shaped member 36 mounts a strain gauge load cell assembly 39. Similarly, an L-shaped guard member 41 extends upwardly from an adjusting base 42 mounts a strain gauge load cell 43. The strain gauge load cells 39 and 43 are known in the load cell art. The strain gauge load cells depicted in the present embodiment are identified as Model 2B31 distributed by BLH Electronics.

Figure 4:
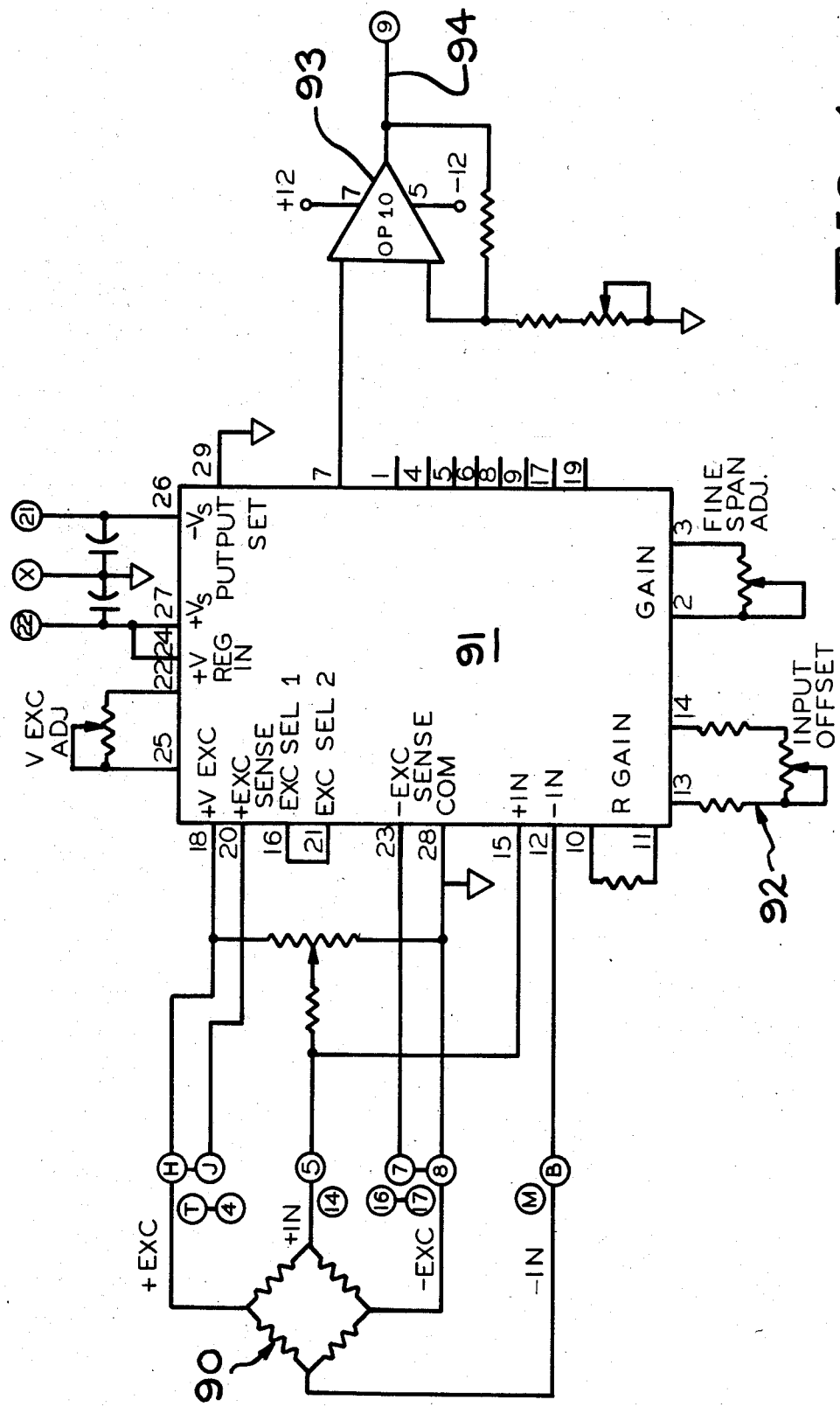
FIG. 4 is a schematic view of the strain gauge load cell circuitry.

Referring to FIG. 4, an electrical schematic of the Model 2B31 strain gauge load cell is shown. A bridging circuit 90 is a standard strain gauge load cell bridging circuit. The unit 91 is the circuitry of the Model 2B31 load cell. The potentiometer circuits 92 are included to compensate for an adjustable gain DC amplifier circuit 93. An output lead 94 is provided. The respective strain gauge load cells 39 and 43 each include a mirror image circuitry for providing X-axis and Y-axis deflections to the electronic readout unit 14.

The strain gauge load cell 39 is adjustably connected to the force rod 34 while the strain gauge load cell 43 is adjustably connected to the force rod 35. When force is applied to the force rods 34 and 35 by the deflection of the transmitting member 26, resulting from an unbalanced workpiece, the forces are transmitted to the strain gauge load cells 39 and 43 and to the electronic readout unit 14. The operator may view the degree of unbalance and the location of the unbalance by viewing the visual display 15 on the electronic readout unit 14.

In the hard static balancing machine 10, according to the present invention, the strain gauge load cells 39 and 43, in addition to sensing the force in the force rods 34 and 35, also act as biasing units or spring units. The load cell biasing urges the transmitting member 26 to its home position by applying a restoring force to the force rods 34 and 35.

Micrometer adjusters 46 and 47 are mounted adjacent the load cells 39 and 43. The micrometer adjuster 46 adjustably connects the force rod 34 to the strain gauge load cell 39. Similarly, the micrometer adjuster 47 adjustably connects the force rod 35 to the strain gauge load cell 43. Each of the micrometer adjusters 46 and 47 include a chuck member 49 which engage the respective force rods 34 and 35 and a rotatable micrometer member 50 which is operatively connected to the chuck member 49. Rotation of the micrometer member 50 applies a greater or lesser force on the respective force rods 34 or 35.

A plurality of adjusting connectors 53 are provided on the adjusting bases 37 and 42 whereby these adjusting bases may be adjusted relative to the overall machine base 11. Load cell vertical adjustments are possible by using connectors 54, shown in FIGS. 2 and 5. Initial adjustments are normally made after manufacture of the balancing machine 10 and prior to its shipment to a factory setting. The position of the strain gauge load cells 39 and 43 is adjusted to place the readout on the electronic readout unit 14 at its zero or home position. It has been found that after shipment to a factory setting that various conditions can move the unit away from the home or null position. It has been found that severe ambient temperature changes often occur in a factory. The balancing machine 10 minimizes the temperature differentials by extending the force rods 34 and 35 completely through the support member 18. However, small adjustments may be made at the factory by using the micrometer adjusters 46 and 47 to return the electronic readout 14 to its home position. Major adjustments require movement of the load cells 39 and 43 by using connectors 53 and 54.

Referring to FIGS. 3 and 6, a pair of damping assemblies 56 and 57 are provided. Each of the damping assemblies 56, 57 includes a cup member 58 which is mounted on the machine base 11. The cup member 58 receives a complementary disc member 59. Connecting arms 60 connect disc members 59 to the ring 31 mounted on the periphery of the transmitting tube 26. The cup member 58 is filled with a viscous material such as a viscous oil. The damping members 56 and 57 eliminate undesired recurring oscillation of the transmitting tube 26 during the measurement of workpiece unbalance.

Load cell stops 63 are provided adjacent the transmitting member 26 in opposed relationship to each of the load cells 39 and 43. Each of the load cell stops 63 includes a mounting block 64 extending up from the base 11. A stop member 65 is mounted on the transmitting tube 26 and extends outwardly in overlying relationship with the mounting block 64. An oversized hole 66 is provided in the stop member 65. A bolt 67 extends through the oversized hole 66 and is threadably engaged in the mounting block 64. As the transmitting member 26 moves during the measurement of workpiece unbalance, the stop member 65 also moves relative to the mounting block 64. The engagement of the bolt 67 against the walls of the oversized hole 66 limits the swing of the transmitting member 26, thereby protecting against overloading of the load cell assemblies 39 and 43.

It will be appreciated that various modifications and changes may be made in the above described hard static balancing machine without departing from the scope of the following claims.

What I claim is:

1. A hard static balancing machine comprising, in combination,
   a stationary support member having an upper end and a lower end, said stationary support member defining a vertical axis, a pivot pin member mounted on such vertical axis adjacent said upper end of said stationary support member, a workpiece support assembly mounted on said pivot pin member, a transmitting member depending from said workpiece support assembly adjacent said stationary support member, at least two force rods attached to said depending transmitting member and extending outwardly from said stationary support member, said force rods extending completely through said depending transmitting member and said stationary support member, a strain gauge load cell assembly attached to each of said force rods for measuring workpiece displacement and for applying a restoring force to each of said force rods.

2. A hard static balancing machine, according to claim 1, and adjusting means mounted on said force rods for adjusting the force on the rods.

3. A hard static balancing machine, according to claim 2, wherein said adjusting means comprises a micrometer adjuster including a chuck member connected to one of said force rods and a rotatable micrometer member operatively connected to said chuck member, whereby rotation of said micrometer member applies a greater or lesser force on said rod.

4. A hard static balancing machine, according to claim 1, wherein said transmitting member comprises a depending tube.

5. A hard static balancing machine, according to claim 1, including at least one damping means in communication with said transmitting member for damping oscillation of said transmitting member.

6. A hard static balancing machine, according to claim 1, including travel stop means adjacent said transmitting member for restricting movement of said transmitting member, whereby overloading of said load cell assemblies is prevented.

7. A hard static balancing machine, according to claim 1, including means on said workpiece support assembly for retarding rotation of said support assembly relative to said stationary support member.

8. A hard static balancing machine comprising, in combination, a stationary support member having a tubular periphery and defining a vertical axis, a pivot pin member mounted along such vertical axis at the upper end of said stationary support member, a workpiece support assembly pivotally mounted on said pivot pin member, a tubular transmitting member depending from said workpiece support assembly adjacent said stationary support member, two force rods attached to said tubular transmitting member at 90° angles to one another, said force rods extending completely through said tubular transmitting member and said stationary support member, a strain gauge load cell assembly attached to each of said force rods for measuring workpiece displacement and for applying a restoring force to its respective force rod, and adjusting means mounted on said force rods for adjusting the force on the rods.

* * * * *